United States Patent [19]

Creel et al.

[11] Patent Number: 4,549,814
[45] Date of Patent: Oct. 29, 1985

[54] TEST PLATE HAVING A THERMAL TEST PATTERN

[75] Inventors: Georges N. Creel, Saint Arnoult; Claude Morelle, Chatenay-Malabry, both of France

[73] Assignee: U.S. Philips Corporation, New York, N.Y.

[21] Appl. No.: 556,756

[22] Filed: Dec. 1, 1983

[30] Foreign Application Priority Data

Dec. 17, 1982 [FR] France ................. 82 21188

[51] Int. Cl.$^4$ ................................ G01D 18/00
[52] U.S. Cl. ........................ 374/2; 250/252.1
[58] Field of Search ............ 374/1, 2; 250/252.1; 356/124.5

[56] References Cited

U.S. PATENT DOCUMENTS

| | | | |
|---|---|---|---|
| 2,463,813 | 3/1949 | Shepard | 351/239 |
| 3,283,148 | 11/1966 | Schwarz et al. | 250/65 |
| 3,492,076 | 1/1970 | Back | 356/124.5 |
| 3,694,624 | 9/1972 | Buchta | 374/134 X |
| 3,977,795 | 8/1976 | Buschmann | 356/124.5 |
| 3,986,384 | 10/1976 | Giorgi | 374/2 |
| 4,058,734 | 11/1977 | Vroombout | 374/126 X |
| 4,315,150 | 2/1982 | Darringer et al. | 374/124 |
| 4,324,459 | 4/1982 | Gerharz | 356/124.5 X |
| 4,387,301 | 6/1983 | Wirick et al. | 250/252.1 |

*Primary Examiner*—Daniel M. Yasich
*Attorney, Agent, or Firm*—Marc D. Schechter

[57] ABSTRACT

A thermal test pattern comprises motifs of a material having a high thermal emissivity which are provided on one side of a flat substrate. The substrate has a low thermal emissivity. The other side of the substrate is covered with a layer of a material having a high electrical resistivity which is provided between two conductive connection strips. The motifs and connection strips and resistive layer may be deposited by silk screening. Due to the differences in thermal emissivity, a temperature difference occurs between the substrate and the motifs, the motifs being colder, when the substrate is heated by passing an electric current through the resistive layer.

7 Claims, 3 Drawing Figures

TEST PLATE HAVING A THERMAL TEST PATTERN

BACKGROUND OF THE INVENTION

The invention relates to a thermal test pattern for a collimator. The test pattern can be used to check the operation of an infrared camera.

The resolving power of a camera is determined by a test pattern by establishing the number of observed stripes per surface unit. When this determination is carried out in the laboratory, the test pattern consists of a number of slots provided in a metal screen. The observed slots have a temperature which is equal to that of a black body which is placed behind the screen. The temperature difference between the black body and the screen is accurately determined. If it is desired to establish the performance limits of the camera, collimators having large dimensions can be used.

If, however, the thermal camera is mounted on board of an airplane, for example, it is not possible to have the extensive measuring equipment for carrying out tests of the video circuit. In that case, only a single control operation can be performed, and it must be performed rapidly and at any instant, even if the surroundings observed by the camera do not exhibit any thermal gradient. This is the case, for example, during a flight over the sea where the picture is nearly uniform when no ship or other object is visible. Under these circumstances, the camera can be tested by using a collimator of smaller dimensions which forms a thermal test pattern at infinity. The test pattern is recorded by the camera mounted in a gyrostabilized tower. The camera is directed so that its axis is parallel to the collimator's axis.

SUMMARY OF THE INVENTION

It is an object of the invention to design a simple and reproducible thermal test plate on which a temperature pattern is obtained.

According to the invention, the thermal test pattern comprises a number of motifs of a material of a high thermal emissivity on one side of a flat substrate. The substrate has a low thermal emissivity. On the other side, the substrate is covered with a layer having a high electrical resistance. Two connection strips of a conductive material as provided for supplying an electric current to the layer. The electric current thus heats the test pattern. As a result of the difference in the thermal emissivities of the substrate and of the motifs, a temperature gradient is formed between the substrate and the motifs. The motifs are colder than the substrate.

Motifs of a material having a high thermal emissivity can be obtained by depositing such a material on the substrate, for example by means of silk screening.

The advantages of such a test pattern are as follows. The test pattern can easily be manufactured by known technologies and is readily reproducible. The motifs can also be changed in a simple manner and a simple supply circuit is possible because the temperature need not be controlled.

It is to be noted that, because the value of the temperature difference between the substrate and the motifs is unknown, such a test pattern cannot be used as a measuring device. However, this test pattern is suitable for the above-mentioned control operation.

DESCRIPTION OF THE PREFERRED EMBODIMENTS

Figure 1A:
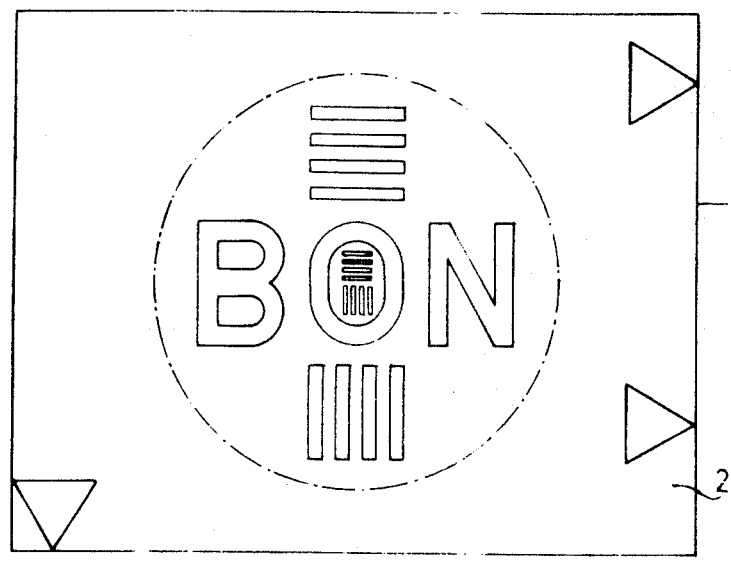
FIGS. 1a and 1b are elevational views of the front and the rear sides, respectively, of an embodiment of the thermal test pattern according to the invention.
Figure 1B:
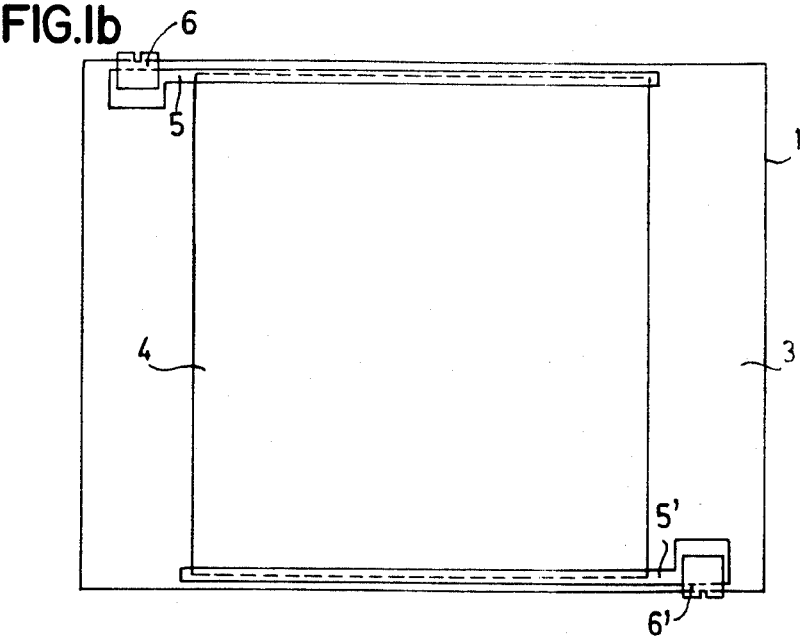

In the embodiment shown in FIGS. 1a and 1b, the substrate of low thermal emissivity consists of a rectangular plate 1 of 96–99% aluminium oxide. Plate 1 has dimensions of 25.4 mm×20 mm. Soft or hard substrates of filled ferrite, beryllium oxide or enamelled steel may alternatively be used.

FIG. 1a is an elevation of the front 2 of the plate 1. Motifs are obtained on the front 2 of plate 1 by depositing material of a high thermal emissivity, for example gold, by silk screening in thick layers. These motifs are provided within a circle which has a diameter of 15 mm. The center of the circle is in the center of the plate 1. The diameter of the circle corresponds to the diameter of the beam bounded by the collimator.

The motifs consist of a number of stripes provided one above the other with letters in between. The central area of this pattern, where the best results are found, comprises in a letter O four parallel horizontal stripes above four parallel vertical stripes. The stripes in the central area of the test pattern have the same dimensions (for example, length=1.05 mm, width=0.15 mm), and are separated from each other regularly by an intermediate space having the width of one stripe.

The peripheral zone of the test pattern, where generally poorer results are found also comprises parallel stripes. The stripes are again separated from each other by regular intermediate spaces which are equal to the width of one stripe. However, the stripes are larger than those of the stripes of the central area (for example, length=3.5 mm, width=0.5 mm). These stripes consist of four horizontal elements and four vertical elements provided above and below, respectively, the letter O. The letters B and N are provided on opposite sides of the letter O. Small triangles are provided on the front 2 of plate 1 as positioning points.

The motifs obtained by silk screening may be silver, copper, silver-palladium, platinum silver, or a resistance material.

FIG. 1b is an elevation of the rear face 3 of the plate 1. Rear face 3 is covered by a layer 4 having a high electrical resistance. Layer 4 comprises ruthenium oxide and is provided between two conductive connection strips 5 and 5' of gold-platinum or of silver-palladium also obtained by silk screening. The conductive connection strips 5 and 5' have widened zones for connecting, for example by soldering, metal contacts 6 and 6' of, for example, tin-plated phosphorus-bronze or tin-plated brass, for supplying an electrical current to the layer. The electric current through layer 4 heats the test pattern. The resistance of the layer is approximately 700 ohm and it dissipates approximately 1 Watt at a current of 4 mA.

The difference in thermal emissivities causes a temperature difference between the substrate and the motifs, the motifs being colder. This temperature difference also remains after several hours in operation.

The thermal test pattern thus manufactured is placed in a Newton-collimator, for example, with a focal distance of 250 mm. The collimator is mounted in a tube of 80 mm diameter and it has a germanium window.

Figure 2:
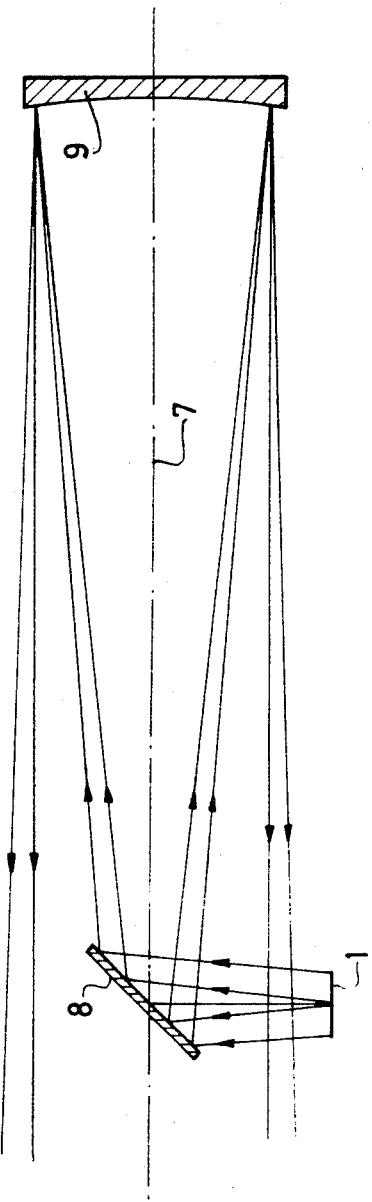
FIG. 2 schematically shows the optical system of a collimator with which the thermal test pattern can be used.

FIG. 2 schematically shows the optical system of the collimator.

The plate 1, on which the thermal test pattern is provided, is provided laterally of and parallel to the optical axis 7 of the collimator. The radiation from the test pattern is incident on a flat mirror 8. Mirror 8 is oriented at an angle of 45° with respect to the axis 7 of the collimator and forms the test pattern in the focal plane of a concave mirror 9. Concave mirror 9 is arranged on axis 7 and reflects the image to infinity.

What is claimed is:

1. A thermal test plate for use with a collimator comprising:
    a flat dielectric substrate having front and rear faces and a thermal emissivity;
    a number of test pattern motifs on the front face of the substrate, said motifs comprising a material having a thermal emissivity greater than that of the substrate;
    a flat layer of a highly electrically resistive material on the rear face of the substrate; and
    two electrically conductive strips on the rear face of the substrate, said strips connected to opposite sides of the resistive layer for conducting an electric current to the resistive layer material.

2. A thermal test plate as claimed in claim 1, characterized in that the motifs are formed of material deposited on the substrate.

3. A thermal test plate as claimed in claim 2, characterized in that the motifs are formed by silk screening.

4. A thermal test plate as claimed in claim 3, characterized in that the substrate consists of a material from the group of aluminum oxide, soft or hard filled ferrites, beryllium oxide, and enamelled steel.

5. A thermal test plate as claimed in claim 4, characterized in that the motifs consist of a material from the group of gold, silver, copper, an alloy of platinum and gold, an alloy of platinum and silver, an alloy of silver and palladium, and a resistance material.

6. A thermal test plate as claimed in claim 5, characterized in that the electrically resistive layer is ruthenium oxide.

7. A thermal test plate as claimed in claim 6, characterized in that the conductive strips consist of a material from the group of an alloy of gold and palladium and an alloy of silver and palladium.

* * * * *